United States Patent [19]
Mergelsberg et al.

[11] Patent Number: 5,298,266
[45] Date of Patent: Mar. 29, 1994

[54] PROCESS TO SUBJECT PUMPABLE CANDY STOCK TO HEAT

[75] Inventors: Reinhard Mergelsberg, Garbsen; Wolfgang Pamp, Bad Salzuflen; Jose-Maria de Vilchez-Kehr, Hanover, all of Fed. Rep. of Germany

[73] Assignee: Klockner Hansel GmbH, Hanover, Fed. Rep. of Germany

[21] Appl. No.: 944,964

[22] Filed: Sep. 15, 1992

[30] Foreign Application Priority Data

Sep. 16, 1991 [DE] Fed. Rep. of Germany ....... 4130721

[51] Int. Cl.$^5$ ............................................. A23G 7/00
[52] U.S. Cl. ................................. 426/511; 426/520; 426/660
[58] Field of Search ................. 426/511, 519, 520, 660

[56] References Cited

U.S. PATENT DOCUMENTS

| | | | |
|---|---|---|---|
| 4,752,487 | 6/1988 | Collyer et al. | 426/511 |
| 4,867,999 | 9/1989 | Mergelsberg et al. | 426/520 |
| 4,973,488 | 11/1990 | Ernster | 426/522 |

Primary Examiner—George Yeung
Attorney, Agent, or Firm—Hopkins & Thomas

[57] ABSTRACT

A process and apparatus to subject a pumpable mass of candy stock to heat, by conveying the candy stock to be heated through a heating coil (7) of a steam heated heat exchange (6). A fluid medium is added to the candy stock upon entry into the heat exchange (6) and as the candy stock leaves the heat exchanger it is guided into a receiving tank (13) which allows the medium to escape the candy stock. The medium to be added to the candy stock is steam, such that by the condensation of the steam the temperature of the candy stock is raised at least into the vicinity of its boiling point, preferably above its boiling point.

4 Claims, 3 Drawing Sheets

PROCESS TO SUBJECT PUMPABLE CANDY STOCK TO HEAT

FIELD OF THE INVENTION

This invention relates to a process subjecting a pumpable candy stock to heat, specifically milk-caramel stock, which is conveyed through the heating coil of a steam heated heat exchanger, whereby a medium is added to the candy stock to be treated upon entering into the heat exchanger and the candy stock exiting the heat exchanger is guided into a receiving tank in which the medium can escape from the candy stock. The apparatus to perform this process is equipped with a steam heated heat exchanger containing a heating coil and a receiving tank for the candy stock, located downstream.

BACKGROUND OF THE INVENTION

A process according to the described prior art is known from DE-PS 36 41 223. Upon entry into the heat exchanger a gas, as medium, is added to the candy stock to be treated. This gas is homogeneously mixed with the candy stock and finally the mixture is put through the heat exchanger. The volume of the candy stock is enlarged by the addition of the gas, such that an improved heat transfer results from the altered mass ratios. The supplied gas creates turbulences inside the stock and the turbulence is responsible that the stock within the heat exchanger is being continuously mixed such that the heat received by the stock at the heat exchanger wall is immediately carried away. This is done to counteract the danger of the candy stock to be heated at least partially burning and spoiling.

Never-the-less, one observes that especially temperature sensitive candy stock—delicately treated—as, for example, during the manufacturing of milk-caramel stock, will depend upon the milk composition, the milk portion of the total mass and the actual temperature level, result in burning of milk inside the heating coil of the heat exchanger. Such burnings and cakings (build-ups) of materials or portions of materials are mainly found at the beginning of the heating coil within the heat exchanger, while they are barely or not at all found at the end of the heating coil, i.e. the area pointing toward the receiving tank.

On the other hand, it is known that adding some elements inside the heating coil leads to a higher swirl or turbulence formation of the candy stock within the heating coil, which also improves the heat transfer. Here, the disadvantage is that these added elements often create dead spot in which the candy stock remains for prolonged periods of time in an uncontrolled manner and which can lead to burning. Heating coils of that design can only be cleaned with great difficulty and require a great deal of effort, without being able to guarantee success. Apart from that the turbulence formation cannot be changed during operation such that a control of this process is not possible.

DE PS 38 21 505 reveals a process to manufacture hard-candy stock continuously from a watery solution of ingredients whereby the candy stock is also heated in a heating coil of a heat exchanger. A downstream receiving tank space is provided to allow steam to escape, and in which BRÜDEN can be removed. The material is then transferred by way of a control valve into a chamber in which, depending upon the degree of vacuum additional steam is removed. Additionally installed devices, downstream, enable the addition of flavors, handling the material as it comes out of the machine and subsequent processing of the candy stock. The vacuum in the vacuum chamber also affects the condition in the steam escape area of the receiving tank all the way into the heating coil of the heat exchanger, such that an enrichment of the dry substance of the candy stock can be accomplished at comparatively low temperature. The problem of burning temperature sensitive candy stocks inside the heating coil is here not discussed.

SUMMARY OF THE INVENTION

The purpose of this invention is to introduce a process and an apparatus to provide gentle heating also of temperature sensitive candy stock in a steam heated heat exchanger whereby the occurrence of indications of burning and depositions (fouling) inside the heating coil of the heat exchanger is at least significantly delayed, if not completely avoided.

According to the invention the process as described at the beginning stipulates that steam is added as medium to the candy stock, whereby by is condensation the temperature of the candy stock is raised at least into the vicinity of its boiling point, preferably above its boiling point. While current technology uses a mixture of candy stock and gas for the purpose of enlarging the volume of the candy stock as it passes through the heating coil of the heat exchanger, steam is now added as medium, i.e. a liquid which merely exists in a vapor state (in a form of steam) with the ability to transfer considerable quantities of heat fast and simple by condensation without thereby markedly increasing the volume of the mixture consisting of candy stock and condensed steam. Therefore, the temperature of the candy stock is, prior to entry into the heating coil of the heat exchanger, purposefully and fast raised from room temperature, for example, at least into the vicinity of the boiling point of the candy stock either in a tank or a feed pipe, such that possibly the total inner surface of the heating coil of the heat exchanger is part of the boiling process of the candy stock, i.e. the mixture of candy stock and water. During the boiling process the typical generation of bubbles which originates at the inner surface of the heating coil is purposefully used as mechanical means to transfer single mass particles continuously away from the inner wall and into the flow of the candy mass and thereby counteracting a deposition (fouling) in a reversed direction. While up to now the boiling process of the candy stock happens to take place at any point between the entry and the exit of the heating coil of the heat exchanger, the start of the boiling process is now at least relocated into the entry section of the heating coil of the heat exchanger. The normally disadvantageous addition of more moisture, which is a result of the condensation process, is tolerated by design to assure, on the other hand, that the generation of bubbles is intensified and increased during the boiling process. The new process allows the production of stocks (masses) which are absolutely within the desired dry substance levels just as they were achievable up to now. Considering time, this process can operate continuously significantly longer without interruption and without the formation of depositions compared to what has been the case until now. It is understood that the steam comes in direct contact with the candy stock even though it is mostly or to a very high percentage again separated in the receiving tank. As a result of this new process the laminar flow of the candy stock is also transformed into a turbulent flow at the entry part of the heating coil of the heat exchanger whereby the dwell times of mass particles in the boundary layers are advantageously very small. The need to install turbulence promoters inside the heating coil is totally eliminated. The addition of steam makes it possible to control, respectively govern this process in a simple way and influence the desired result. Adjustments can be made in simple way to accommodate different candy stocks.

It is especially advantageous when steam is added to the candy stock at such quantity, temperature and pressure that the candy stock boils already at the entrance of the heating coil of the heat exchanger. The boiling process must be viewed as dependent upon the prevailing pressure. The boiling process, therefore, extends over the entire area of the heating coil which is here better utilized as compared to the current state of the art. At the same time the heat transfer is improved.

It is preferred to add the steam to the candy stock in regions which are close to the wall. Such wall-proximity regions of the candy stock are defined as those which come in contact with that inner surface of the heating coil at the entrance of the heating coil of the heat exchanger. One is never-the-less able to beneficially use intentionally radial temperature stratification to avoid application of unusually high amounts of water as a result of steam condensation. On the other hand it is also possible to add the steam into the candy stock such that homogenous mixing exists.

The steam can be added advantageously in form of saturated steam. It causes an instant condensation and delivers the highest possible transferrable amount of heat.

The steam supply can be governed by controlling the quantity and/or temperature and/or the pressure of the steam to control the process continuously, i.e. controlling to programmed values which can, depending upon the specific case, be handled in different ways by one and the same apparatus.

To reduce the boiling point of the candy stock inside the heating coil vacuum can effectively be applied. This vacuum can already be applied in the de-steaming space of the receiving tank and from which it propagates into the heating coil in a counter current mode to the direction of flow of the candy stock.

The apparatus to perform the process is unique according to the invention because a steam blending head is provided for the candy stock at the inlet to the heat exchanger. This device can be placed immediately ahead of the inlet, respectively at the inlet, or also a distance upstream of the inlet into the heating coil of the heat exchanger. It is important that at least these regions of the candy stock which are in close proximity to the wall are heated to about the boiling point before they come in contact with the inner surface of the heating coil of the heat exchanger.

The blending head, the hear exchanger and the receiving tank can be designed as a closed system, operating under vacuum, whereby the vacuum is least noticeable in the blending head and foremost effective in the receiving tank and the heating coil. The boiling point is reduced by the vacuum which counteracts burning and accumulation of candy stock on the inner surface of the heating coil as well.

It is possible to provide several heat exchangers with preceding blending heads to heat the candy stock in steps. Also, different pressure levels can be employed to satisfy special demands.

The steam is added into the candy stock in a finely dispersed manner. Accordingly the blending head is equipped with a multitude of cross flow passages which are distributed over its circumference and/or length such that it is possible to achieve the anticipated heating of the candy stock before entering into the heating coil.

BRIEF DESCRIPTION OF THE DRAWINGS

The invention is further explained and described by means of preferred examples as to how it can be realized. It is shown.

Figure 1:
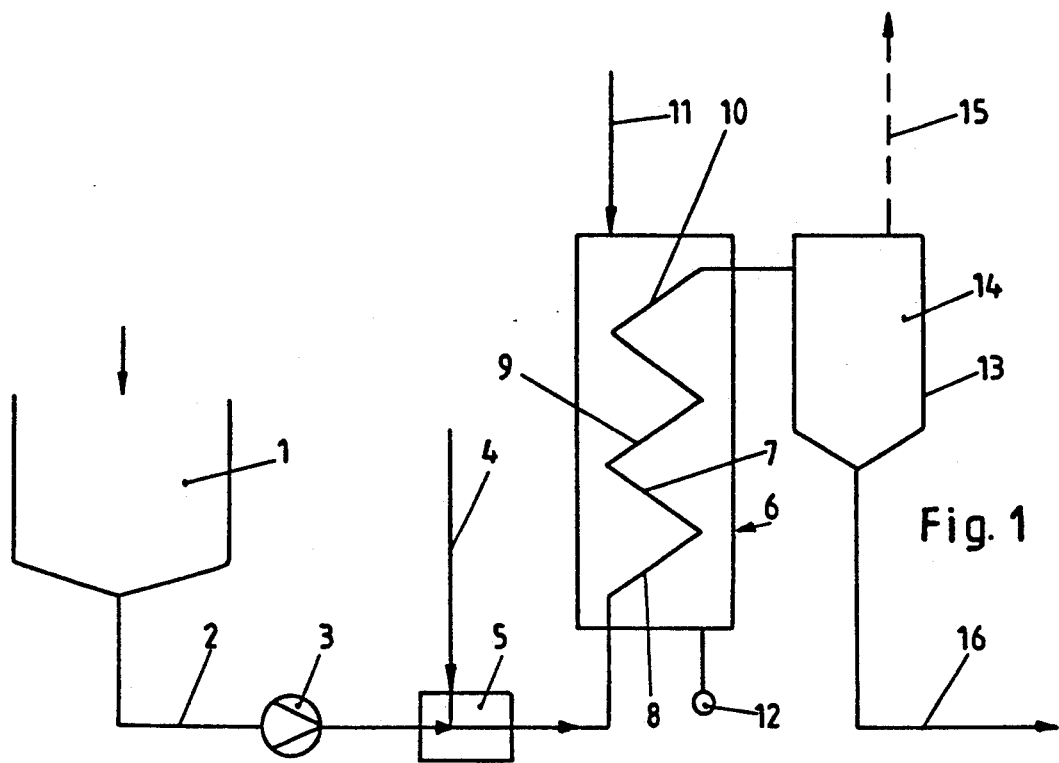
FIG. 1 A schematic representation of the essential elements necessary to perform the process.

Candy stock is in tank 1, for example, at a room temperature between 20 and 30 degrees C. Tank 1 and a blending head 5 are connected by a pipe line 2 by way over a pump 3 through which the candy stock is conveyed. A pipe line 4 through which the steam is supplied, is also connected to the blending head 5, such that the steam is brought in immediate contact with the candy stock inside the blending head 5 for the purpose of heating the candy stock at this point by the condensation of the steam. Pipe line 2 continues from the blending head 5 to a heat exchanger 6 which is of known design. The heat exchanger 6 has a heating coil 7 which specifically consists of a entry zone 8, a middle zone 9 and an exit zone 10. The heat exchanger is heated by steam which is supplied through pipe line 11. A drain 12 is provided to discharge the accumulated condensate. The exit zone 10 of the heating coil 7 of heat exchanger 6 is connected to a receiving tank 13 within which there is a steam escape space 14. Because of the continuing heating of the candy stock within the heat exchanger 6 the generated BRÜDEN are discharged out of the steam escape space 14 of receiving tank 13 by means of a pipe line 15. The heated candy stock with an increased dry-substance content leaves the receiving tank 13 through a pipe line 16 and is being conveyed elsewhere for further treatment or processing.

The candy stock which is in tank 1 at about room temperature is heated into the vicinity of the boiling point within the blending head 5, or better on its way to the entry zone 8 of heating coil 7, by the condensation of the steam which is supplied through pipe line 4. As a result, the entire length of the heating coil 7 of heat exchanger 6 is engaged in the boiling process. This extended process prevents the burning and build-up of candy stock on the inner surface of heating coil 7. Because of the intensified steam bubble formation there is a continuous movement of particles of the candy stock away from the region of the inner wall of the heating coil 7 back into the main stream of the candy stock, such that build up tendencies are counteracted. Depending upon the prevailing conditions it is possible for the candy stock to experience turbulent flow, such that the disadvantages associated with laminar flow are avoided. For example, in the area of the exit zone 10 of heating coil 7 the temperature of the candy stock can be 110 degrees C., such that within the steam escape space 14 of receiving tank 13 another desteaming process is added by which the dry-substance content of the candy stock is increased as desired.

Figure 2:
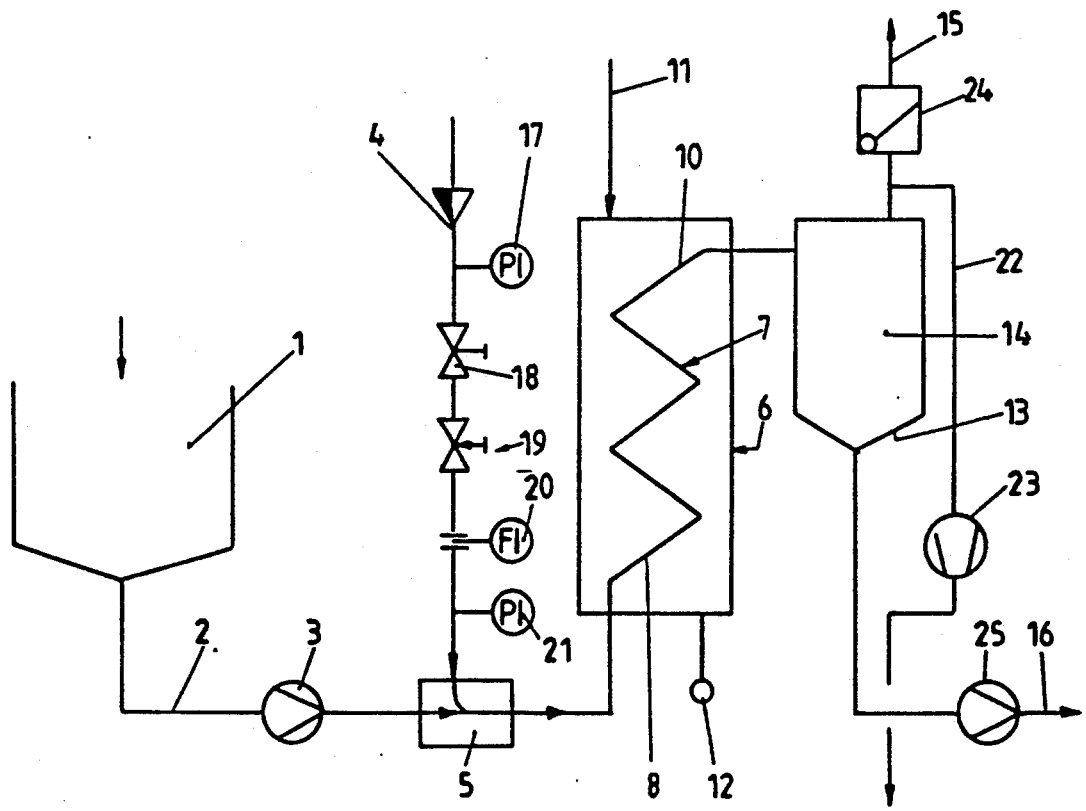
FIG. 2 A second schematic example of a possible apparatus.

The schematic representation according to FIG. 2 shows a similarly designed apparatus with its essential components to perform the process. Several elements are considered in association with pipe line 4 to regulate the steam. The steam supply pressure is indicated by manometer 17. A pressure regulating valve 18 allows the adaptation of the pressure. A steam supply valve 19 allows for pipe line 4 to be totally shut off in order to process other stocks in the same apparatus but without using the blending head 5. In addition one can install a steam mass flow meter 20 and another manometer 21 downstream of steam supply valve 19 and ahead of blending head 5.

A pump 23 to create a vacuum is connected to the steam escape space 14 within receiving tank 13 by means of pipe line 22. The vacuum is not only effective in the steam escape space 14 but also propagates backwards into the heating coil 7. A safety blockoff device 24 is installed as indicated in pipe line 15 such that the vacuum can be maintained. Another pump 25 can be installed in pipe line 16 to further convey the treated candy stock.

The candy stock which is heated to the boiling point at the entry zone 8 of heating coil 7 is pumped out of the steam escape space 14, and therefore the receiving tank 13, through the connected pipe line and pump 25. The advantage of this apparatus rests with the fact that the boiling process which leads to turbulent flow exits already at low temperatures and progresses in an intensified manner such that in addition the tendencies to burn are counteracted by it.

Figure 3:
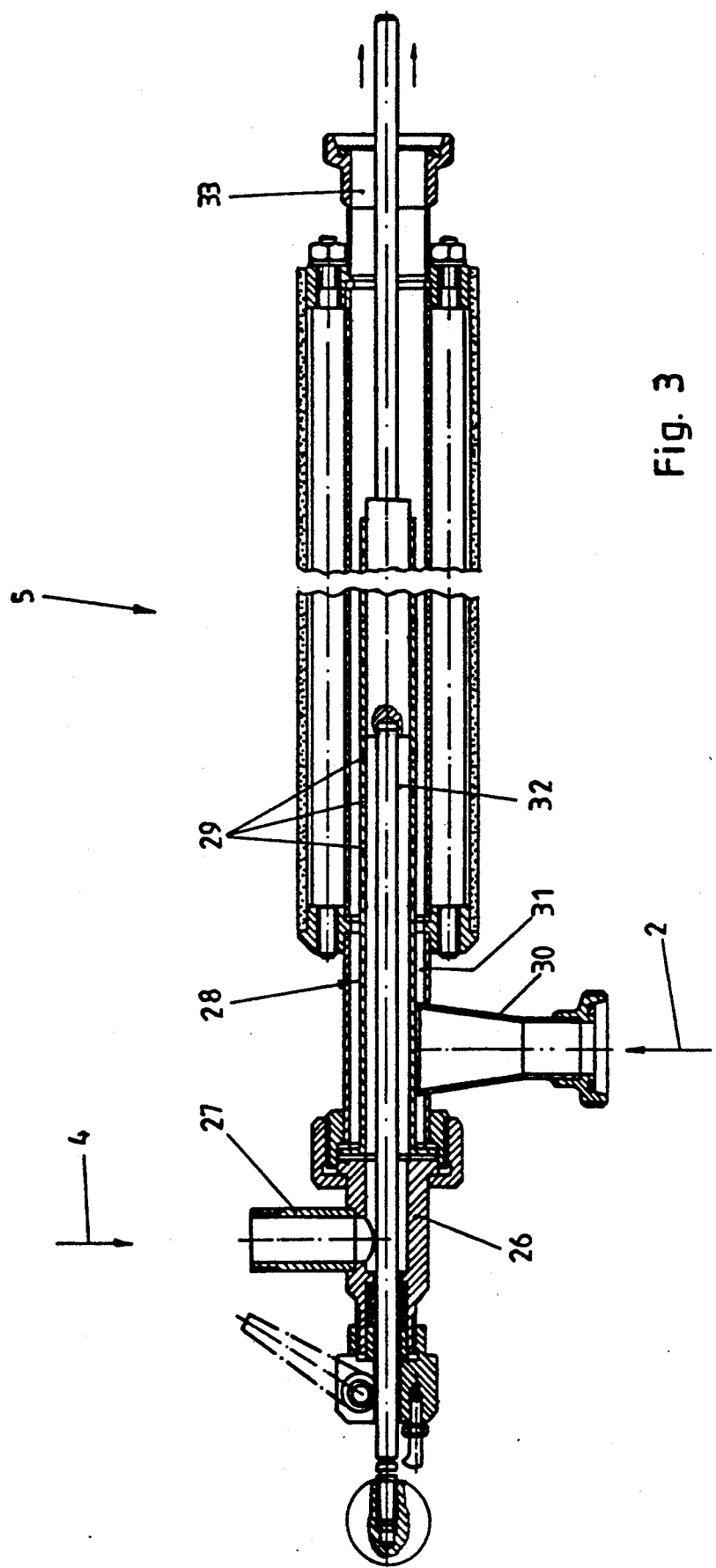
FIG. 3 An example of a blending head to introduce steam.

FIG. 3 shows a possible design of blending head 5. Steam is supplied through pipe line 4 which terminates with a steam supply nipple 27 in housing 26. Mixing pipe 28, located in a fixed position in housing 26, carries a multitude of cross-flow passages 29 which are distributed over its circumference but also over a certain length in direction of flow. Nozzle 30 serves to connect pipe line 2 which is also connected to pump 3 and through it the candy stock is brought into a ring-like space 31 surrounding the mixing pipe 28. A piston 32, designed to move axially, is born inside the mixing pipe 28 such that depending upon its relative position within the mixing pipe 28 a greater or lesser number of cross-flow passages are opened or covered. The blending head 5 is equipped with an exit 33, through which the candy stock exits, and which as a result of steam condensation is heated to the boiling point. Exit 33 can be directly connected to the entry zone 8 of the heat exchanger 6. Otherwise, it is also possible to put a piece of pipe 2 between the blending head 5 the entrance to the heat exchanger 6 in order to achieve an even better mixing of the heated candy stock before it gets to the entry zone 8 of the heat exchanger 6.

Figure 4:
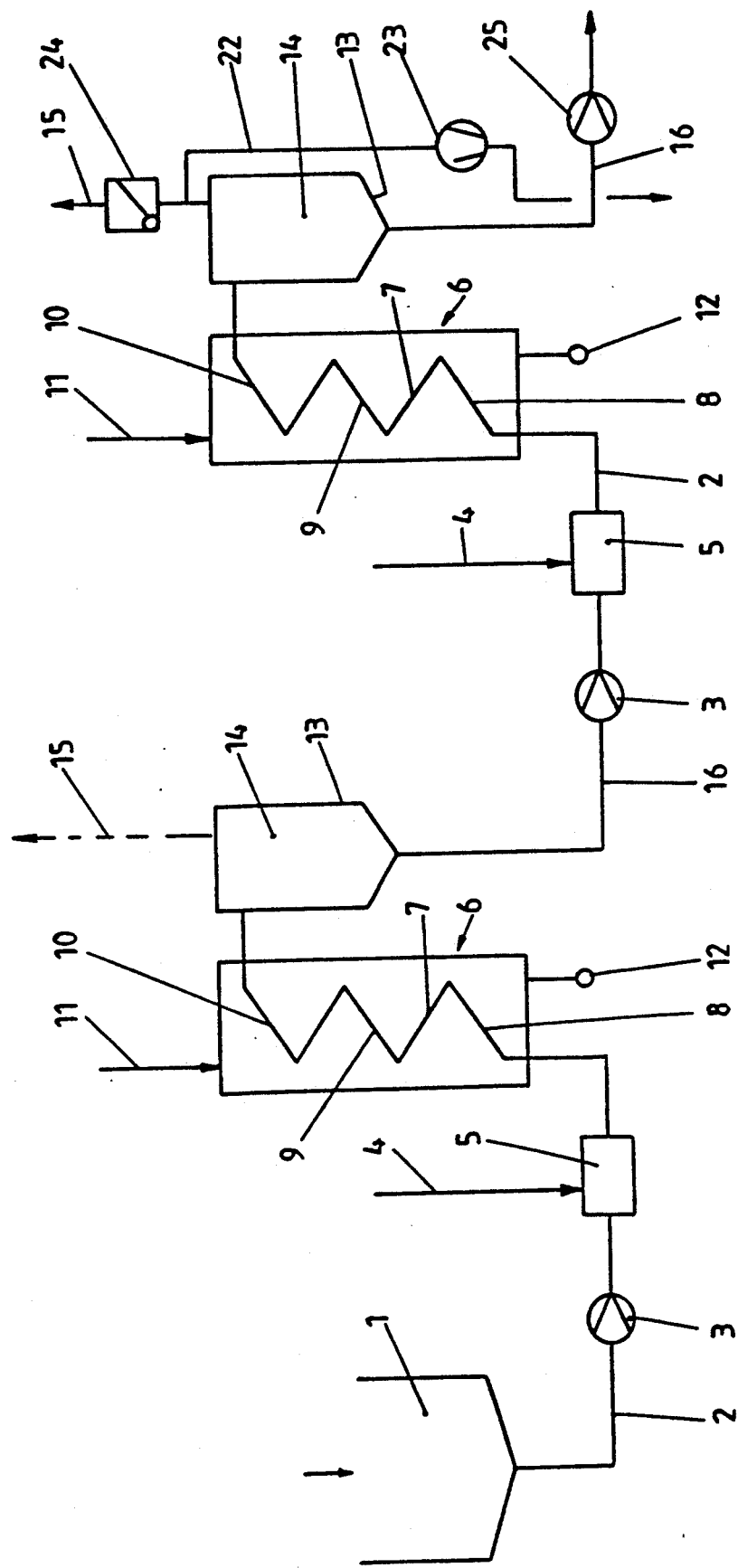
FIG. 4 A schematic representation of the essential elements of a two-stage process.

The described process can also be performed in several steps. For example, FIG. 4 shows an apparatus whereby in a first stage the candy stock is conveyed through a first heat exchanger 6 at normal pressure, while in a second stage, respectively a second section, vacuum is applied. Reference is made to the description of FIGS. 1 and 2 regarding the design and the process of the two-stage approach.

It is understood that it is possible to operate several stages under normal pressure or several stages under a vacuum as well.

While the foregoing discloses specific embodiments of the invention, it will be understood by those skilled in the art that variations and modifications thereof can be made without departing from the spirit and scope of the invention, as described in more detail by the following claims.

NOMENCLATURE

1 = Tank
2 = Pipe Line
3 = Pump
4 = Pipe Line
5 = Blending head
6 = Heat Exchanger
7 = Heating coil
8 = Entry zone
9 = Middle zone
10 = Exit zone
11 = Pipe line
12 = Drain
13 = Receiving tank
14 = Steam escape space
15 = Pipe line
16 = Pipe line
17 = Manometer
18 = Pressure regulating valve
19 = Steam supply valve
20 = Steam mass flow meter
21 = Manometer
22 = Pipe line
23 = Pump
24 = Safety block-off device
25 = Pump
26 = Housing
27 = Steam supply nipple
28 = Mixing pipe
29 = Cross-flow passage
30 = Nozzle
31 = Ring-like space
32 = Piston
33 = Exit

We claim:

1. Process to subject pumpable candy stock to heat by conveying the candy stock through the heating coil of a heat exchanger having a steam heated chamber, comprising: adding a medium to the candy stock upon the entry of the candy stock into the heat exchanger; and guiding the candy stock exiting the heat exchanger into a receiving tank which allows for the medium to escape the candy stock, wherein said medium which is added to the candy stock is steam and that by the condensation of the steam the temperature of the candy stock is elevated to a temperature that is approximately equal to or greater than the boiling point of the candy stock.

2. Process according to claim 1, wherein the steam is supplied to the candy stock at such quantity, temperature and pressure that the candy stock is boiling upon entry into the heat exchanger.

3. Process according to claim 1, wherein the steam is added to the candy stock in areas near the wall.

4. Process according to claim 3, wherein the steam is added in the form of saturated steam.

* * * * *

UNITED STATES PATENT AND TRADEMARK OFFICE
CERTIFICATE OF CORRECTION

PATENT NO. : 5,298,266

DATED : March 29, 1994

INVENTOR(S) : Michael Berman

It is certified that error appears in the above-identified patent and that said Letters Patent is hereby corrected as shown below:

Column 1, Line 52: Insert a period after "tests".
Column 2, Line 12: Insert a period after "line".
Column 2, Line 13: Insert a period after "track".
Column 3, Line 21: Delete the comma after "of".
Column 3, Line 23: Delete "Permitting"; insert --permitting--
Column 3, Line 25: Insert a period after "gravity".
Column 3, Line 29: Delete the comma after "Means".
Column 3, Line 47: After "thereof", insert --to evenly distribute the liquid across the surface of the wafer along a notional plane substantially perpendicular to the pull of gravity.--
Column 4, Line 33: Delete "elements"; insert --Elements--
COlumn 5, Line 13: Delete "FIG. a"; insert --FIG. 1--
Column 5, Line 16: Insert a period after "freely".
Column 5, Line 29: Insert a period after "invention".
Column 5, Line 63: Delete "baring"; insert --bearing--
Column 6, Line 36: After "disposed", insert --away--

Signed and Sealed this

Thirtieth Day of August, 1994

Attest:

BRUCE LEHMAN

Attesting Officer

Commissioner of Patents and Trademarks